(12) United States Patent
Kim et al.

(10) Patent No.: US 12,535,309 B2
(45) Date of Patent: Jan. 27, 2026

(54) OPTICAL COHERENCE TOMOGRAPHY (OCT) SYSTEM WITH A MULTI-PASS DISPERSION COMPENSATION CELL

(71) Applicant: University of Southern California, Los Angeles, CA (US)

(72) Inventors: Wihan Kim, La Crescenta, CA (US); Anna Marie Wisniowiecki, The Woodlands, TX (US); Brian Edward Applegate, Glendale, CA (US); John Steven Oghalai, La Canada Flintridge, CA (US)

(73) Assignee: University of Southern California, Los Angeles, CA (US)

( * ) Notice: Subject to any disclaimer, the term of this patent is extended or adjusted under 35 U.S.C. 154(b) by 221 days.

(21) Appl. No.: 18/256,414

(22) PCT Filed: Dec. 14, 2021

(86) PCT No.: PCT/US2021/072902
§ 371 (c)(1),
(2) Date: Jun. 7, 2023

(87) PCT Pub. No.: WO2022/133433
PCT Pub. Date: Jun. 23, 2022

(65) Prior Publication Data
US 2024/0035805 A1 Feb. 1, 2024

Related U.S. Application Data

(60) Provisional application No. 63/125,876, filed on Dec. 15, 2020.

(51) Int. Cl.
*G01B 9/02091* (2022.01)
*A61B 1/227* (2006.01)
(Continued)

(52) U.S. Cl.
CPC ..... *G01B 9/02091* (2013.01); *G01B 9/02058* (2013.01); *A61B 1/227* (2013.01); *A61B 5/0066* (2013.01)

(58) Field of Classification Search
CPC .............. G01B 9/02091; G01B 9/0209; G01B 9/02058; A61B 1/227; A61B 5/0066
See application file for complete search history.

(56) References Cited

U.S. PATENT DOCUMENTS

2005/0213215 A1* 9/2005 Mitamura .......... G02B 6/29358
359/558
2005/0259265 A1* 11/2005 De Lega ................ G01N 21/45
356/497
(Continued)

FOREIGN PATENT DOCUMENTS

JP    2011 004368    1/2011

OTHER PUBLICATIONS

David Henderson, Jeff Kramer, "Micro Beam Steering: Precision micro beam-steering systems simplify move to handheld instruments"; article from laserfocusworld.com (2015) (Year: 2015).*
(Continued)

*Primary Examiner* — Kara E. Geisel
*Assistant Examiner* — Jonathon Cook
(74) *Attorney, Agent, or Firm* — Knobbe, Martens, Olson & Bear, LLP

(57) ABSTRACT

This disclosure generally relates to an optical coherence tomography (OCT) system. This disclosure particularly relates to an OCT system with a multi-pass dispersion compensation cell incorporated into its reference arm. This disclosure further relates to a hand-held compact OCT system suitable for inspection of an ear of a mammal.

11 Claims, 13 Drawing Sheets

(51) Int. Cl.
*A61B 5/00* (2006.01)
*G01B 9/02056* (2022.01)

(56) References Cited

U.S. PATENT DOCUMENTS

| | | | |
|---|---|---|---|
| 2006/0285849 A1* | 12/2006 | Izumi | G02B 6/29395 |
| | | | 398/81 |
| 2007/0064239 A1 | 3/2007 | Fujita | |
| 2007/0291276 A1* | 12/2007 | Fercher | G01B 9/0209 |
| | | | 356/497 |
| 2008/0246972 A1 | 10/2008 | Dubois et al. | |
| 2010/0321700 A1* | 12/2010 | Hirose | A61B 3/102 |
| | | | 356/450 |
| 2012/0245440 A1* | 9/2012 | Hogan | A61B 3/102 |
| | | | 600/318 |
| 2015/0316764 A1* | 11/2015 | Hunter | G02B 27/0087 |
| | | | 359/558 |
| 2018/0217001 A1* | 8/2018 | Warashina | G01B 9/02044 |

OTHER PUBLICATIONS

Rollins et al., "Reference Optical Delay Scanning," pp. 99-123; 25 pages.

* cited by examiner

OPTICAL COHERENCE TOMOGRAPHY (OCT) SYSTEM WITH A MULTI-PASS DISPERSION COMPENSATION CELL

TECHNICAL FIELD

This disclosure generally relates to an optical coherence tomography (OCT) system. This disclosure particularly relates to an OCT system with a multi-pass dispersion compensation cell incorporated into its reference arm. This disclosure further relates to a hand-held compact OCT system suitable for inspection of an ear of a mammal.

BACKGROUND

Optical coherence tomography (OCT) has become an indispensable clinical imaging tool since its introduction in 1991. For a background of OCT technology, see, for example, Drexler and Fujimoto et al. [1]. OCT is based on an optical measurement technique known as low-coherence interferometry. OCT performs high resolution, cross-sectional imaging of internal microstructure of a physical object ("sample") by directing a light beam to the physical object, and then measuring and analyzing magnitude and time delay of backscattered light.

A cross-sectional image is generated by performing multiple axial measurements of time delay (axial scans or A-scans) and scanning the incident optical beam transversely. This produces a two-dimensional data set of A-scans (i.e. B-scans), which represents the optical backscattering in a cross-sectional plane through the physical object. Three-dimensional, volumetric data sets can be generated by acquiring sequential cross-sectional images by scanning the incident optical beam in a raster pattern (three-dimensional OCT or 3D-OCT). This technique yields internal microstructural images of the physical objects with very fine details. For example, pathology of a tissue can effectively be imaged in situ and in real time with resolutions smaller than 15 micrometers.

Several types of OCT systems and methods have been developed, for example, Time-domain OCT (TD-OCT) and Fourier-domain OCT (FD-OCT). Use of FD-OCT enables high-resolution imaging of retinal morphology that is nearly comparable to histologic analysis. Examples of FD-OCT technologies include Spectral-domain OCT (SD-OCT) and Swept-source OCT (SS-OCT).

A commercially available generalized OCT system is schematically shown in FIG. 1. Such typical prior-art OCT system 100 may comprise at least one light source 110, at least one scanning optics 200, at least one retro-reflector 180, at least one optical fiber coupler 220 or at least one free space coupler, at least one detector 130, and at least one processing system 140.

The at least one light source 110 may comprise any light source, for example, a low coherence light source. Light from the light source 110 may be guided, typically by using at least one optical fiber 220 to illuminate a physical object ("sample') 210. An example of the physical object 210 may be any tissue in a living being. For example, the tissue may be an eye or an ear. The light source 110 may be either a broadband low coherence light source with short temporal coherence length in the case of SD-OCT or a wavelength tunable laser source in the case of SS-OCT. The light may be scanned, typically with a scanning optics 200 between the output of the optical fiber 220 and the physical object 210, so that a beam of light (dashed line with arrows) guided for the physical object 210 is scanned laterally (in x-axis and/or y-axis) over the area or volume to be imaged. The scanning optics 200 may comprise any optical element suitable for scanning. The scanning optics 200 may comprise at least one component. The at least one component of the scanning optics 200 may be an optical component. Light scattered from the physical object 210 may be collected, typically into the same optical fiber 220 used to guide the light for the illumination of the physical object 210. (The physical object 210 is shown in FIG. 1 only to schematically demonstrate the physical object 210 in relation to the OCT system 100. The physical object 210 is not a component of the OCT system 100.)

The OCT system 100 may further comprise a beam splitter 120 to split and guide the light provided by the light source 110 to a reference arm 230 and a sample arm 240. The OCT system may also further comprise a lens 160 placed between the beam splitter 120 and the retro-reflector 180. The OCT system may also further comprise another lens 170 placed between the beam splitter 120 and the scanning optics 200.

Reference light 250 derived from the same light source 110 may travel a separate path, in this case involving the optical fiber 220 and the retro-reflector 180 with an adjustable optical delay. The retro-reflector 180 may comprise at least one component. The at least one component of the retro-reflector 180 may be an optical component, for example, a reference mirror. A transmissive reference path may also be used and the adjustable delay may be placed in the sample arm 240. The adjustable delay 255 may also be placed in the reference arm 230.

Collected light 260 scattered from the sample 210 may be combined with reference light 250, typically in the fiber coupler to form light interference at the detector 130, thereby forming an OCT signal. Although a single optical fiber port is shown going to the detector 130, various designs of interferometers may be used for balanced or unbalanced detection of the interference signal for SS-OCT or a spectrometer detector for SD-OCT.

The output from the detector 130 may be supplied to the processing system 140. Results may be stored and/or displayed in the processing system 140. The processing and storing functions may be localized within the OCT system or functions may be performed on an external processing unit to which the collected data is transferred. This external unit may be dedicated to data processing or perform other tasks that are quite general and not dedicated to the OCT system. Balanced detection systems may typically be used in TD-OCT and SS-OCT systems, while spectrometers may be used at the detection port for SD-OCT systems.

Light beam as used herein should be interpreted as any carefully directed light path. Ultrahigh-resolution OCT imaging may require light of broad spectral bandwidth. However, for high-resolution OCT, dispersion mismatch between the sample arm 240 and the reference arm 230 may cause a significant broadening of the axial point spread function, reducing image resolution quality. Therefore, accurate compensation for dispersion mismatch between the reference arm and the sample arm is needed to achieve the best possible axial resolution.

In time-domain systems, the reference arm 230 may need to have a tunable optical delay to generate desired interference such that an image with a desired resolution is generated. It is possible to closely match the dispersion of optical components between the sample light path and the reference light path by inserting an appropriate length optically transparent material ("optical cell") 255 in the reference arm 230. This optical cell 255 may, for example, be a solid or a liquid material. A typical example of the optical cell is a water cell. However, because the optical cell has a fixed length, it may be difficult to account for variability in axial lengths of organs, for example ears of different individuals or ears of different living beings such as dogs, cats, and horses.

RELATED ART REFERENCES

The following publications are related art for the background of this disclosure. One digit or two-digit numbers in the box brackets before each reference correspond to the numbers in the box brackets used in the other parts of this disclosure.
[1] Drexler and Fujimoto et al. "Optical Coherence Technology: Technology and Applications" Springer, Heidelberg, Germany, 2008.
[2] Wojtkowski, Maciej & Srinivasan, Vivek & Ko, Tony & Fujimoto, James & Kowalczyk, Andrzej & Duker, Jay. (2004). Ultrahigh-resolution, high-speed, Fourier domain optical coherence tomography and methods for dispersion compensation. Optics express. 12. 2404-22. 10.1364/OPEX.12.002404.
[3] WooJhon Choi, Bernhard Baumann, Eric A. Swanson, and James G. Fujimoto, "Extracting and compensating dispersion mismatch in ultrahigh-resolution Fourier domain OCT imaging of the retina," Opt. Express 20, 25357-25368 (2012).
[4] Hitzenberger C K, Baumgartner A, Drexler W, Fercher A F. Dispersion effects in partial coherence interferometry: implications for intraocular ranging. J Biomed Opt. 1999 January; 4(1):144-51. doi: 10.1117/1.429900. PMID: 23015179.
[5] Fingler et al. "Dynamic Motion Contrast and Transverse Flow Estimation Using Optical Coherence Tomography" U.S. Pat. No. 7,995,814.
[6] Wihan Kim, Sangmin Kim, John S. Oghalai, and Brian E. Applegate, "Endoscopic optical coherence tomography enables morphological and subnanometer vibratory imaging of the porcine cochlea through the round window," Opt. Lett. 43, 1966-1969 (2018)

The entire contents of each of the above references, including its supplemental content, if available, are incorporated herein by reference.

SUMMARY

This disclosure generally relates to an optical coherence tomography (OCT) system. This disclosure particularly relates to an OCT system with a multipass dispersion compensation cell incorporated into its reference arm. This disclosure further relates to a hand-held compact OCT system suitable for inspection of an ear of a mammal.

The OCT system of this disclosure is suitable for interrogation of a sample. This OCT system may include at least one light source, at least one detector, a reference arm, a sample arm, a beam splitter, and a processing system. The light source may form a light beam.

In this disclosure, the reference arm may include a multipass dispersion compensation cell and a mirror. The multipass dispersion compensation cell may include a transparent medium, and at least one reflective surface. The multipass dispersion compensation cell can be configured to allow the light beam to enter the multi-pass dispersion compensation cell and exit the multi-pass dispersion compensation cell. The multi-pass dispersion compensation cell may be configured to extend path length of the light beam that entered the multi-pass dispersion compensation cell by bouncing the light beam on the reflective surface back and forth before the light beam exits the multi-pass dispersion compensation cell. The multi-pass dispersion compensation cell may further include at least one transparent surface ("multi-pass dispersion compensation cell window") to allow the light beam to enter the multi-pass dispersion compensation cell and exit the multi-pass dispersion compensation cell. The multi-pass dispersion compensation cell further may also include at least two multi-pass dispersion compensation cell windows. The multi-pass dispersion compensation cell may include at least two reflective surfaces.

In this disclosure, the reflective surface may be that of a mirror.

In this disclosure, the multi-pass dispersion compensation cell's transparent medium may include a gas, a liquid, a solid, or a combination thereof. The gas, the liquid, the solid, or the combination thereof may be transparent to the light beam such that an OCT signal can be formed at the detector of the OCT system.

In this disclosure, the multi-pass dispersion compensation cell's transparent medium may include a solid. This multi-pass dispersion compensation cell may include at least one reflective surface. This multi-pass dispersion compensation cell may also include at least two reflective surfaces facing each other. These reflective surfaces may face each other. These reflective surfaces may be parallel to each other. These reflective surfaces may be substantially flat.

In this disclosure, the multi-pass dispersion compensation cell's transparent medium may include a gas. This multi-pass dispersion compensation cell may include two reflective surfaces facing each other. These reflective surfaces may face each other. These reflective surfaces may be parallel to each other. These reflective surfaces may be substantially flat. Any of these reflective surfaces may be formed by having a surface of a mirror.

In this disclosure, the shape of the reflective surface may be flat, curved, or a combination thereof. At least one of the surfaces of the multi-pass dispersion compensation cell may be curved.

In this disclosure, the multi-pass dispersion compensation cell may be spherical in shape. The sphere's surface may be reflective, except where the light beam enters the spherical multi-pass dispersion compensation cell and where the light beam exits the spherical multi-pass dispersion compensation cell.

In this disclosure, the multi-pass dispersion compensation cell may include at least two reflective surfaces oriented with respect to each other such that the light entering into the multi-pass dispersion compensation cell bounce back and forth between the at least two reflective surfaces at least once, thereby delaying the light before it leaves the multi-pass dispersion compensation cell through the transparent surface of the multi-pass dispersion compensation cell.

In this disclosure, the reference arm may further include a light guiding system ("reference arm light guiding system") that can be configured to control the angle of incidence of the light beam formed by the light source entering and/or exiting the multi-pass dispersion compensation cell, thereby increasing the path length of the light beam. The light guiding system may include at least one rotating mirror. The light guiding system may include at least two rotating mirrors.

In this disclosure, the OCT system may further include a beam splitter to split and guide the light beam formed by the light source to the reference arm and the sample arm.

In this disclosure, the OCT system may include a hand-held OCT unit ("HHOCT unit"). The HHOCT unit may include a reference arm, a sample arm, and a detector. The reference arm may include a multi-pass dispersion compensation cell and a reference arm mirror. The reference arm may further include a reference arm light guiding system.

In this disclosure, the sample arm may include at least one scanning mirror. The sample arm may further include an optical probe. The optical probe may be configured to guide the light beam to a surface of the sample. The sample arm may also include at least one scanning optic. The optical probe may include a gradient index (GRIN) lens.

In this disclosure, the processor may be configured to perform functions, including: receive an OCT signal from the detector, modify/process the OCT signal, store any information related to the interrogation of the sample and/or operation of the OCT system, retrieve any stored information, report/convey said information to a user, control functions of the OCT system's hardware, or a combination of these functions.

Any combination of above features of methods, formulations, and systems are within the scope of this disclosure.

These, as well as other components, steps, features, objects, benefits, and advantages, will now become clear from a review of the following detailed description of illustrative examples, the accompanying drawings, and the claims.

BRIEF DESCRIPTION OF DRAWINGS

The drawings are of illustrative examples. They do not illustrate all examples. Other examples may be used in addition or instead. Details that may be apparent or unnecessary may be omitted to save space or for more effective illustration. Some examples may be practiced with additional components or steps and/or without all the components or steps that are illustrated. When the same numeral appears in different drawings, it refers to the same or like components or steps.

DETAILED DESCRIPTION

Figure 1:
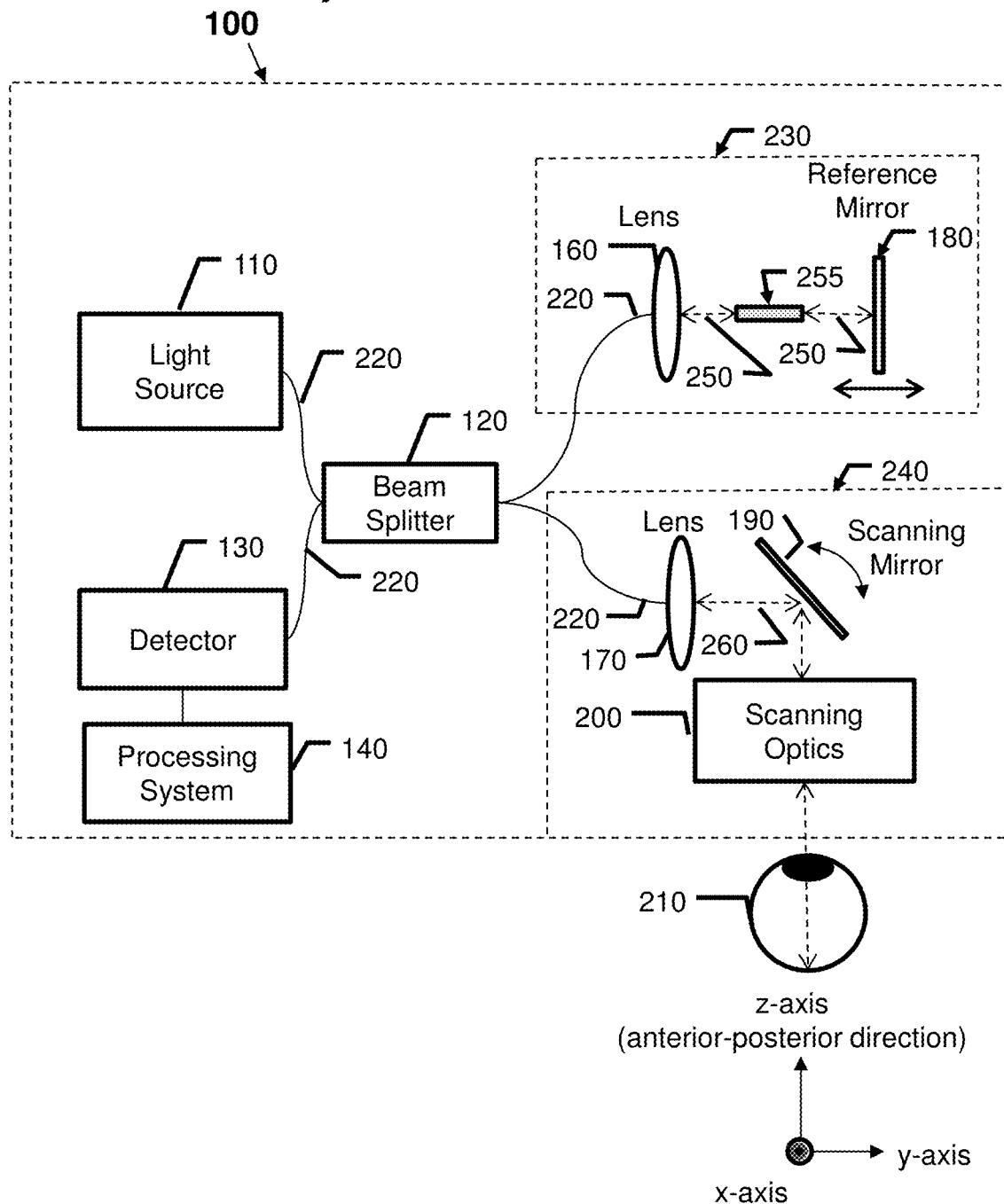
FIG. 1. illustrates a prior-art OCT system with a prior-art optical cell used for the dispersion compensation.

Illustrative examples are now described. Other examples may be used in addition or instead. Details that may be apparent or unnecessary may be omitted to save space or for a more effective presentation. Some examples may be practiced with additional components or steps and/or without all the components or steps that are described.

This disclosure generally relates to an optical coherence tomography (OCT) system. This disclosure particularly relates to an OCT system with a multi-pass dispersion compensation cell incorporated into its reference arm. This disclosure further relates to a hand-held compact OCT system suitable for inspection of an ear of a mammal.

The OCT system of this disclosure may include at least one light source, at least one detector, a reference arm, a sample arm, and a processing system. The OCT system may further include a beam splitter to split and guide the light provided by the light source to a reference arm and a sample arm. The OCT system may further include a scanning optics.

The OCT system of this disclosure can also include a dispersion compensating unit ("multi-pass dispersion compensation cell") incorporated to the reference arm to accurately compensate for dispersion mismatch between the reference arm and the sample arm to achieve the best possible axial resolution. The multi-pass dispersion compensation cell of this disclosure can include a transparent medium (material), at least one transparent surface, and at least one reflective surface.

The transparent medium of the multi-pass dispersion compensation cell may comprise any transparent material that can receive and transmit light formed by the light source through its body. For example, this transparent material may comprise a gas (e.g. air), a liquid (e.g. water), a solid (e.g. a glass), or a combination thereof. The light formed by the light source may enter the multi-pass dispersion compensation cell through the transparent surface and/or leave the multi-pass dispersion compensation cell through the transparent surface. The reflective surface of the multi-pass dispersion compensation cell may reflect the light entering the multi-pass dispersion compensation cell to guide the light through the multi-pass dispersion compensation cell and out of the multi-pass dispersion compensation cell through the transparent surface.

The multi-pass dispersion compensation cell may comprise at least two reflective surfaces which may be oriented with respect to each other such that the light entering into the multi-pass dispersion compensation cell bounces back and forth (e.g., is reflected) between the at least two reflective surfaces at least once, thereby delaying the light (e.g., prolonging the amount of time the light is in the multi-pass dispersion compensation cell or extending the length of the path the light travels) before it leaves the multi-pass dispersion compensation cell through the transparent surface of the multi-pass dispersion compensation cell.

The OCT system of this disclosure may further include a light guiding system ("reference arm light guiding system") that controls the angle of incidence of the light formed by the light source entering and/or leaving the multi-pass dispersion compensation cell.

The dispersion mismatch, in this disclosure, may be compensated through the delay of the light in the transparent material and due to the number of back and forth bounces (e.g., reflections) of the light in the transparent material. The delay of the light in the transparent material may be controlled by choosing a transparent material with a desired refractive index. The delay of the light due to the number of back and forth bounces of the light in the transparent material may be controlled by the shape of the reflective surface (e.g. flat, curved, or any other surface shape), and the number of reflective surfaces (e.g. more than one reflective surface), and through controlling of the angle of incidence of the light entering into the multi-pass dispersion compensation cell.

Figure 2:
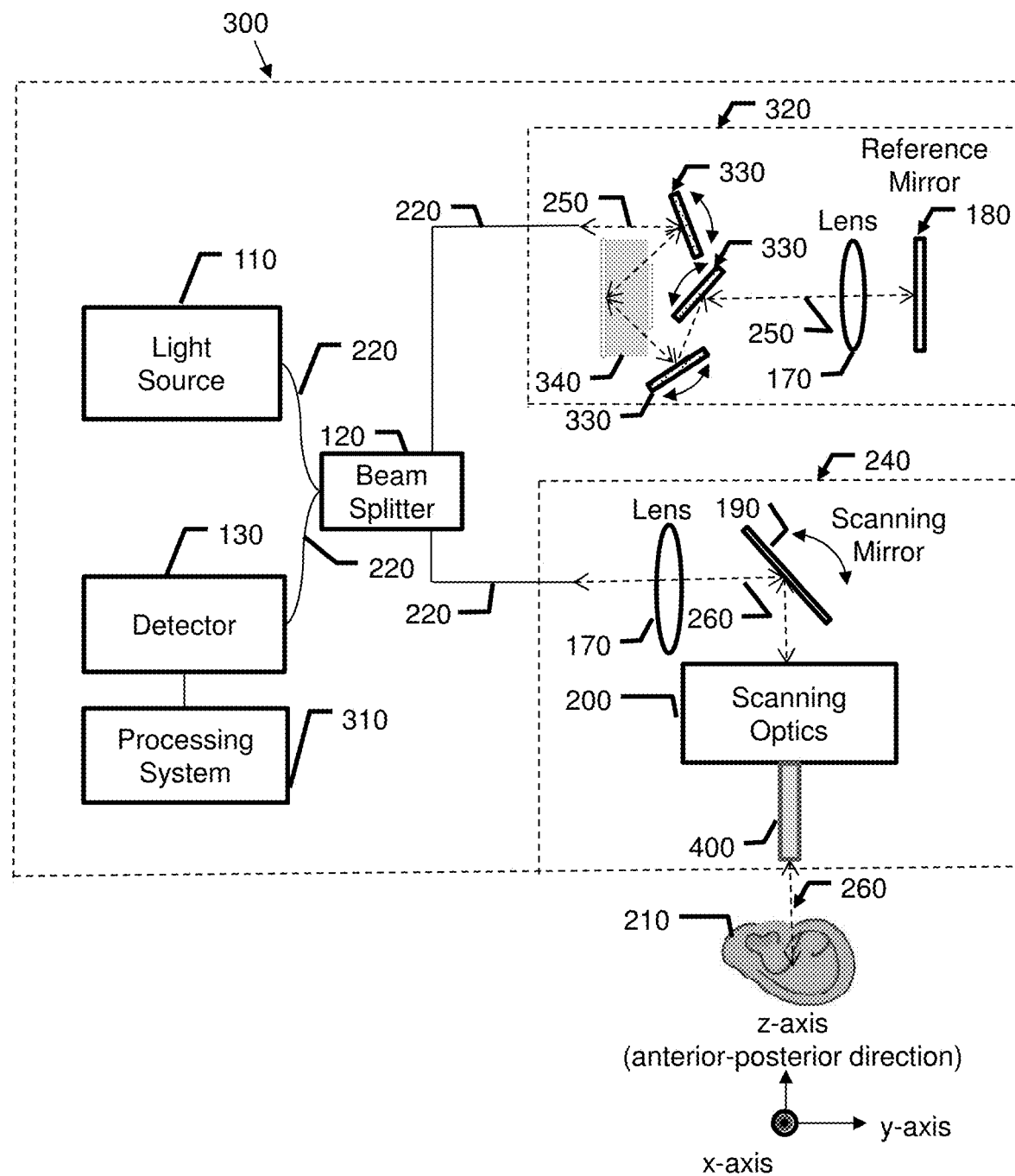
FIG. 2. illustrates an exemplary OCT system with an exemplary multi-pass dispersion compensation cell of this disclosure.

An exemplary OCT system of this disclosure is schematically shown in FIG. 2. This OCT system 300 may include at least one light source 110, at least one beam splitter 120, at least one sample arm 240, at least one reference arm 320, at least one detector 130, and at least one processing system 310.

The at least one light source 110 may comprise any light source, for example, a low coherence light source. The light source 110 may be a broadband low coherence light source with short temporal coherence length in the case of SD-OCT or a wavelength tunable laser source in the case of SS-OCT.

The OCT system 100 may further comprise a beam splitter 120 to split and guide the light provided by the light source 110 to the reference arm 230 and the sample arm 240.

The reference arm 320 may include at least one multi-pass dispersion compensation cell 340 and at least one reference arm reflector (or "reference arm mirror") 180. The multi-pass dispersion compensation cell 340 may also be referred to as a "white cell 340", for example in the Figures. An exemplary multi-pass dispersion compensation cell 340 and an exemplary reference arm light guiding system 350 are illustrated in FIG. 3 in more detail.

The reference arm 320 may further include a light guiding system ("reference arm light guiding system") 350 that controls the angle of incidence of the light beam formed by the light source entering and/or exiting the multi-pass dispersion compensation cell 340. The light beam entering and exiting the multi-pass dispersion compensation cell 340 is schematically shown in FIG. 2 with bracketed lines and arrows 250. In this exemplary OCT system of this disclosure, the reference arm light guiding system 350 may include at least one rotating mirror ("light guiding system mirror").

Figure 3:
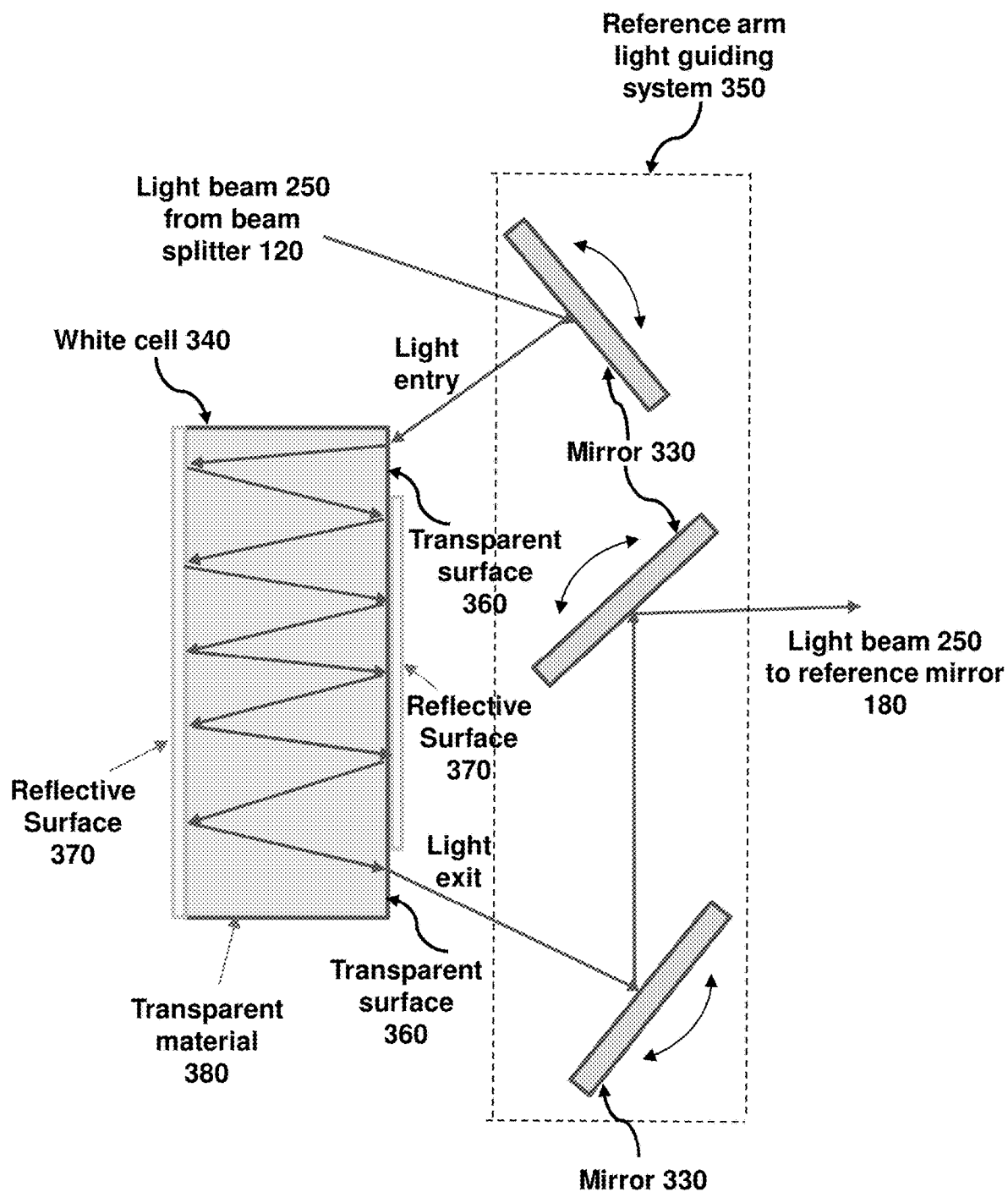
FIG. 3. illustrates an exemplary multi-pass dispersion compensation cell with the reference arm light guiding system of this disclosure.
Figure 6:
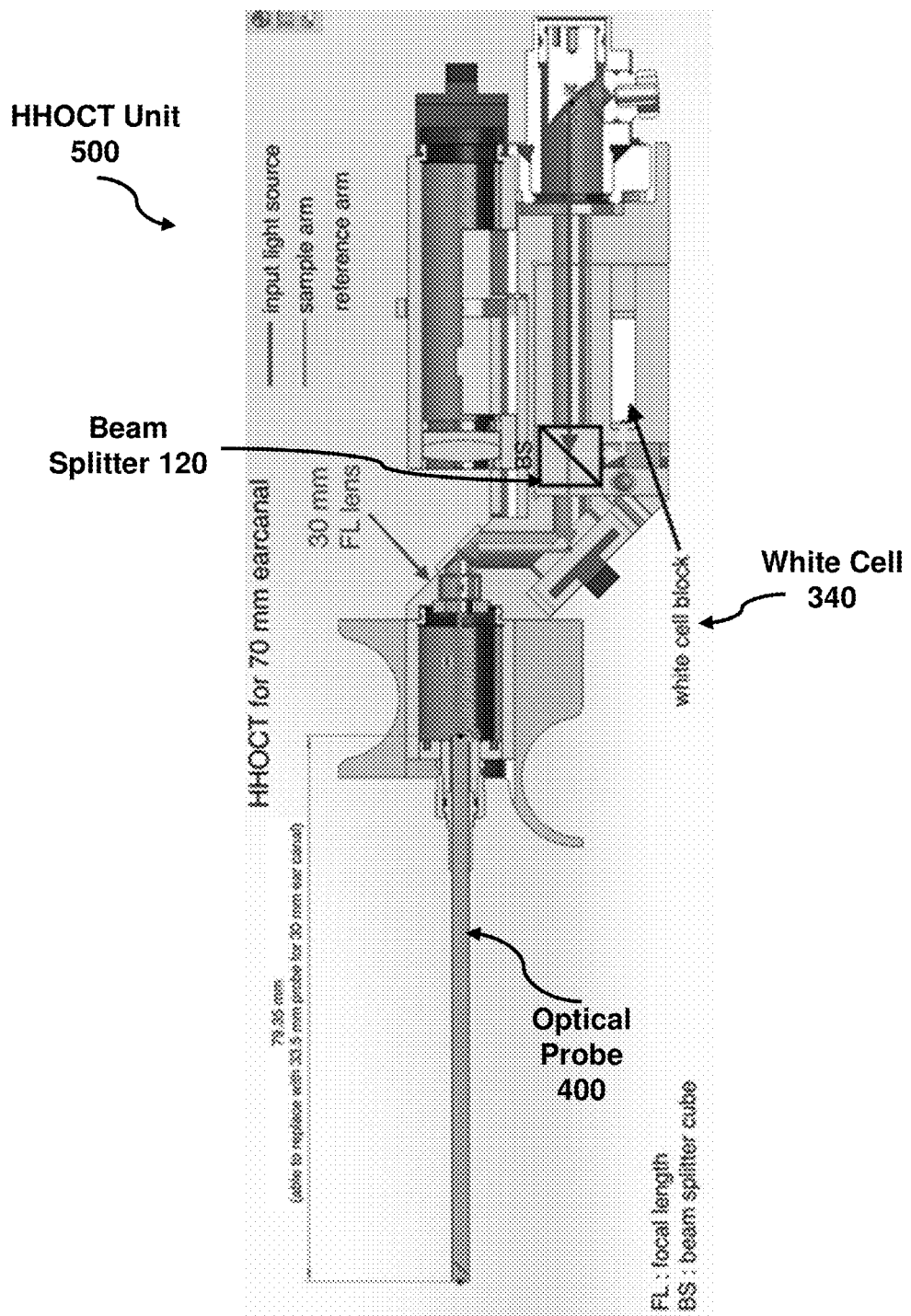
FIG. 6. illustrates an exemplary HHOCT unit of this invention that may be used for interrogation of ear canals that may have length varying in the range of 30 millimeters and 90 millimeters.

In one exemplary multi-pass dispersion compensation cell 340, the reference arm light guiding system 350 may include three mirrors 330, as shown in FIG. 3. The angle of incidence of light beam entering the multi-pass dispersion compensation cell through its transparent surface is controlled by controlling the angle of the light guiding system mirrors 330. In this example, the multi-pass dispersion compensation cell includes a transparent rectangular prism 380 wherein two surfaces 370 are reflective to the light beam 250. The light beam 250 enters to this exemplary multi-pass dispersion compensation cell through one transparent surface ("multi-pass dispersion compensation cell window") 360 and exits from another transparent surface ("multi-pass dispersion compensation cell window") 360. The photographs of this exemplary multi-pass dispersion compensation cell manufactured as a component of the hand-held OCT unit ("HHOCT unit") are shown in FIG. 6.

The reference arm 320 may further include a lens 170 to guide the light 250 transmitted from the multi-pass dispersion compensation cell and/or the reference arm light guiding system to the reference mirror 180, and back from the reference mirror to the multi-pass dispersion compensation cell and/or the reference arm light guiding system.

An exemplary sample arm 240 of the OCT system of this disclosure 300 may include at least one scanning (rotating) mirror 190, and at least one scanning optics 200 to guide the light 260 (shown as bracketed line with arrows) from the light source 110 and/or the beam splitter 120 to the sample (or the physical object) 210 and back to the detector 130.

The light may be scanned, typically with a scanning optics 200 between the output of the optical fiber 220 and the physical object 210, so that a beam of light 260 guided for the physical object 210 is scanned laterally (in x-axis and/or y-axis) over the area or volume to be imaged. The scanning optics 200 may comprise any optical element suitable for scanning. The scanning optics 200 may comprise at least one component. The at least one component of the scanning optics 200 may be an optical component.

An exemplary OCT system of this disclosure 300 may further include at least one optical fiber 220 or at least one free space coupler to guide light the light formed by the light source 110 to the beam splitter 120, the reference arm 320 and the sample arm 240, and back to the beam splitter 120 and the detector 130. Light scattered from the physical object 210 may be collected, typically into the same optical fiber 220 used to guide the light for the illumination of the physical object 210.

Collected light 260 scattered from the sample 210 may be combined with reference light 250, typically in the fiber coupler to form light interference in the detector 130, thereby forming an OCT signal. Although a single optical fiber port is shown going to the detector 130, various designs of interferometers may be used for balanced or unbalanced detection of the interference signal for SS-OCT or a spectrometer detector for SD-OCT.

The output from the detector 130 may be supplied to the processing system 310. Results may be stored in and/or displayed on the processing system 310. The processing system 130 may be configured to perform any function useful for a user of the OCT system 300. The user may be any user. For example, the user may be a human such as a medical staff. Some or all aspects of the OCT system 300, including the processing system 310, can be implemented using a computing system. The computing system can include one or more hardware processors. The computing system can be separate from the OCT system 300 and can be configured to execute instructions to perform one or more functions of the processing system 310. Example functions of the processing system 310 may, for example, include receiving an OCT signal from the detector 130, modifying or processing the OCT signal, storing any information, retrieving any information, reporting or conveying the information to a user, controlling functions and/or operations of the OCT system including the OCT system's hardware, or a combination of any of the foregoing functions. The modifying or processing the OCT signal may include generating A-scans, B-scans, a combination of such scans, or images. The information may include any information. Examples of the information may include raw or processed OCT signals, sample information, user information, any information related to the OCT system 300, or a combination thereof. The information may be conveyed to the user in any form suitable for the user. Such information may be conveyed to the user, for example, in a numerical form, an image form, a sound form, a visual form, an auditory, a mechanical form (e.g. vibration), or a combination of such forms. Such information may also be displayed to the user for example, through an imaging screen (such as a computer monitor.) As such, the processing system 130 may include any hardware and/or software necessary to carry out such functions.

Such processing and storing functions may be localized within the OCT system and/or may be performed on an external processing unit to which the collected data is transferred. This external unit may be dedicated to data processing or perform other tasks that are quite general and not dedicated to the OCT system. Balanced detection systems may typically be used in TD-OCT and SS-OCT systems, while spectrometers may be used at the detection port for SD-OCT systems.

An example of the physical object 210 may be any tissue of a living being. For example, the tissue may be an eye or an ear. The living being may be any organism. The living being may be any mammal. The mammal may be a human, a dog, a cat, or a horse. For example, the OCT system of this disclosure may enable direct, real-time observation of the middle ear and, in a surgical configuration, a few millimeters into the inner ear.

The light beam 260 from the sample arm may be guided to the surface of the physical object by using an optical component ("sample arm probe" or "optical probe") 400. The sample arm probe may comprise any optical component. For example, the sample arm probe may comprise a gradient index (GRIN) lens.

Example 1. An Exemplary OCT System of this Disclosure

An exemplary OCT system 300 and its components constructed to interrogate an ear are shown in FIGS. 4-9.

Figure 4:
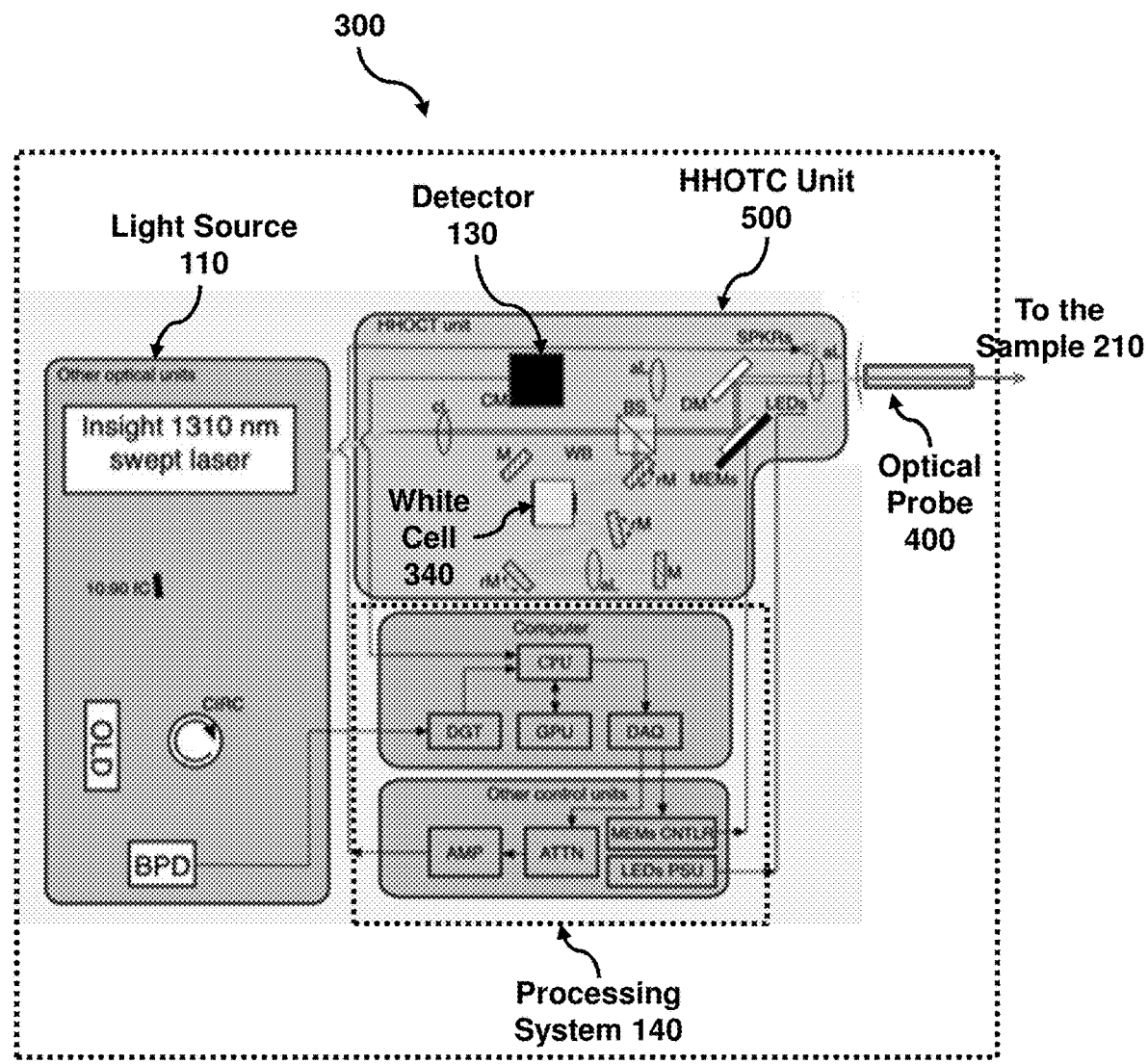
FIG. 4. illustrates an exemplary OCT system with an exemplary multi-pass dispersion compensation cell of this disclosure.
Figure 5:
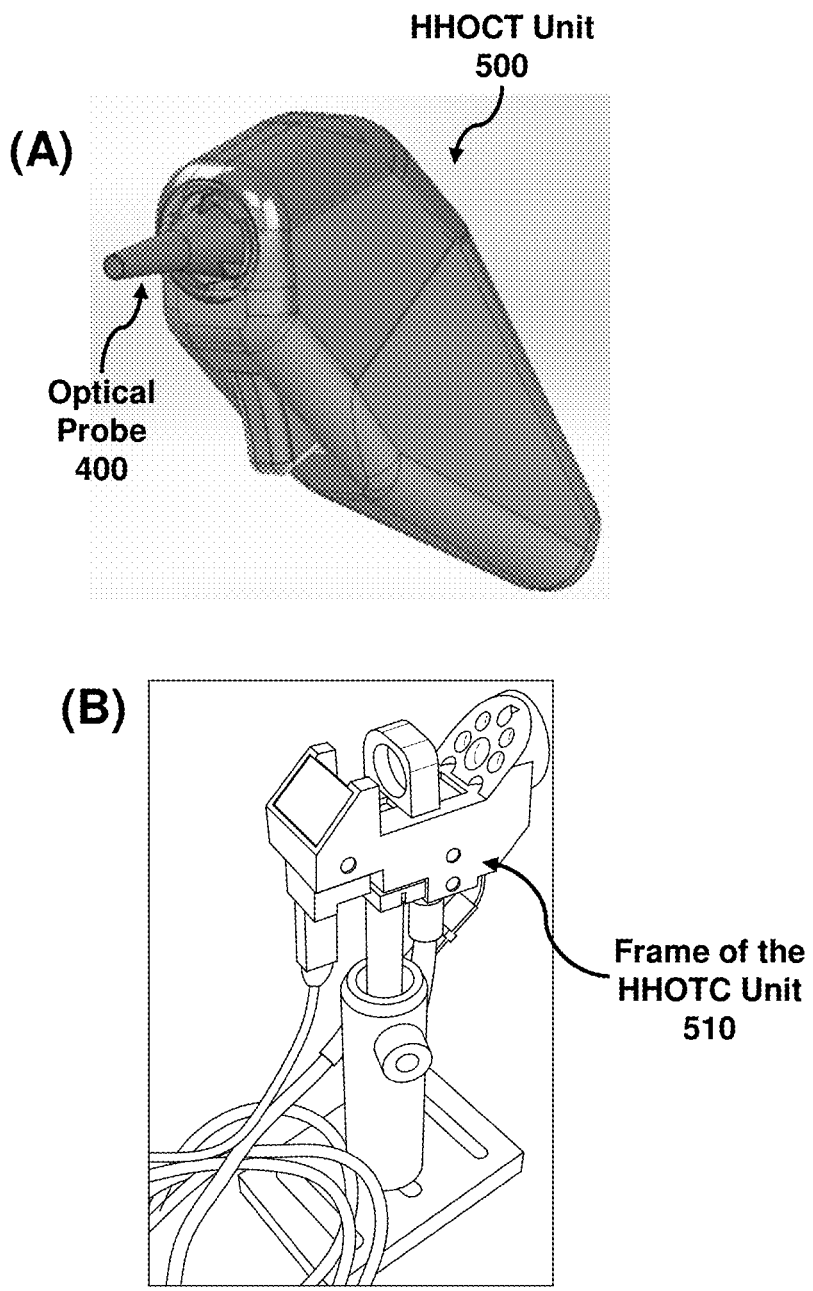
FIG. 5. illustrates (A) an exemplary hand-held unit of the OCT system ("HHOCT unit") and (B) an exemplary frame manufacture to house the components of the HHOCT unit.

The schematics of this system is shown in FIG. 4. This exemplary OCT system 300 includes a light source 110, a hand-held unit of the OCT system ("HHOCT unit") 500, and a processing system 140. The HHOCT unit 500 includes a detector 130, a beam splitter (BS) 120, a reference arm 320, a sample arm 240, and an optical probe 400. The sample arm 240 of the HHOCT unit 300 includes the multi-pass dispersion compensation cell 340, the reference arm light guiding system 350 comprising three mirrors (rM), a lens (aL) 170, and a reference mirror (M) 180.

An exemplary HHOCT unit manufactured in this example is schematically shown in FIG. 5(A) with its optical probe 400. A photo of the HHOCT unit's frame 510, manufactured in this example, is shown in FIG. 5(B). This frame housed the HHOCT unit's components including the detector, the beam splitter, the reference arm components, the sample arm components, and the optical probe.

Example 2. Exemplary HHOCT Units Comprising Sample Probes with Varying Lengths

The length of the sample arm probe 400 may vary according to the distance of the sample arm and the surface of the physical object. For example, the sample arm probe may need to be inserted into the ear canal of the mammal to inspect health condition of the middle ear or the inner ear of a mammal. And the length of the ear canal varies from mammal to mammal and/or between a member of a mammal. For example, the canine family has the longest ear canal among the domesticated animals, reaching about 7 centimeters (cm) in length for large dogs weighing about 55 kilograms (kg). The ear canal varies from dog to dog depending their weight, and can be as short as 3 cm for dogs about 1 to 2 kilograms. For horses, the average ear canal length may only be about 3 cm.

Considering this range of variation of anatomical dimensions, the OCT system 300 of this disclosure may need to include a sample arm probe 400 with varying lengths. For example, to inspect an inner ear of a dog with varying weights, a set of sample arm probes with lengths in a range of 30 millimeters and 70 millimeters (mm) may be needed. The dispersion mismatch between the sample arm 240 and the reference arm 320 caused by the sample arm probes 400 of different lengths may be compensated through the use the multi-pass dispersion compensation cells 340 and/or the reference arm light guiding system.

Figure 7:
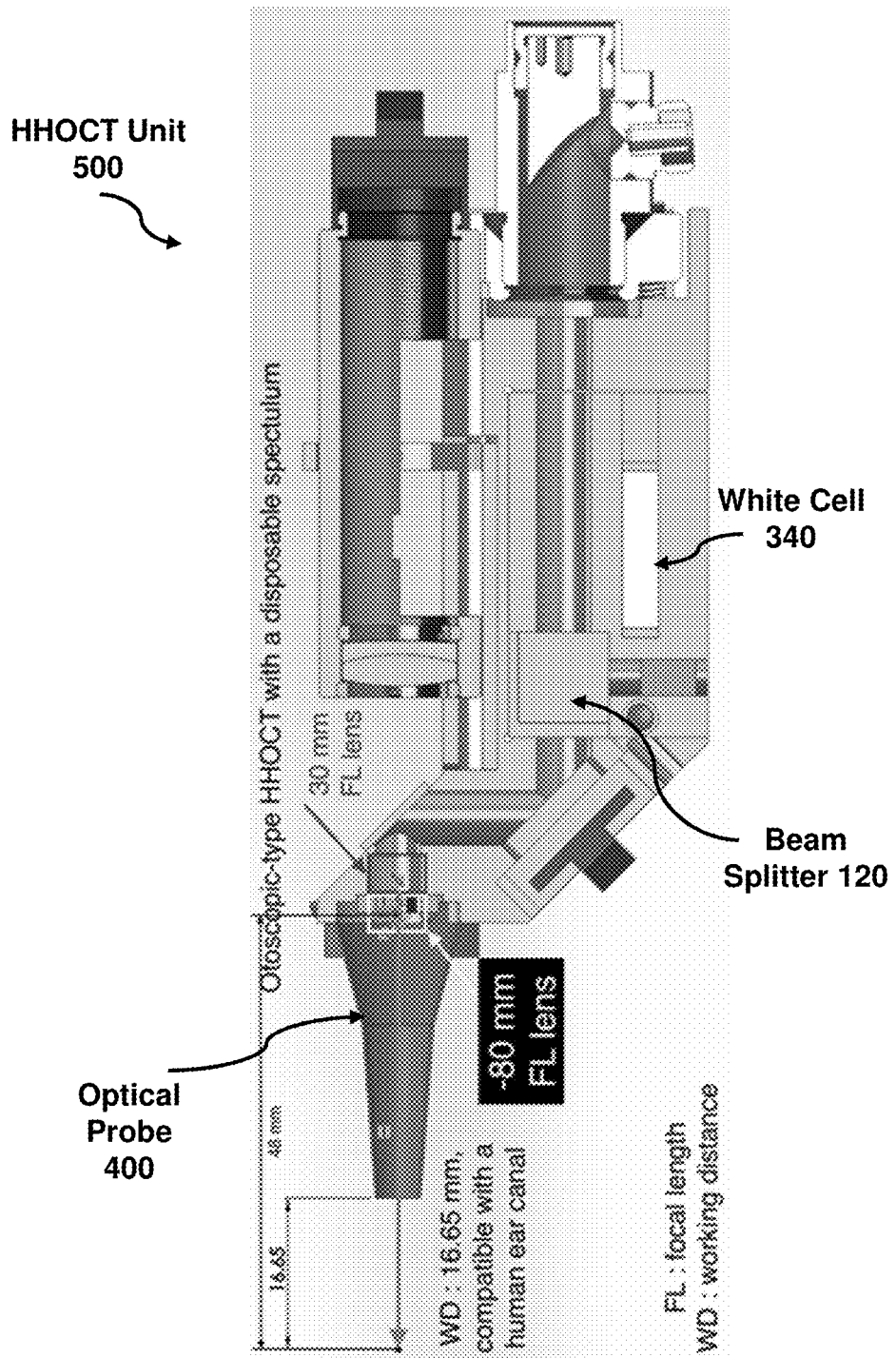
FIG. 7. illustrates an exemplary HHOCT unit of this invention that may be used for otoscopic applications.
Figure 8:
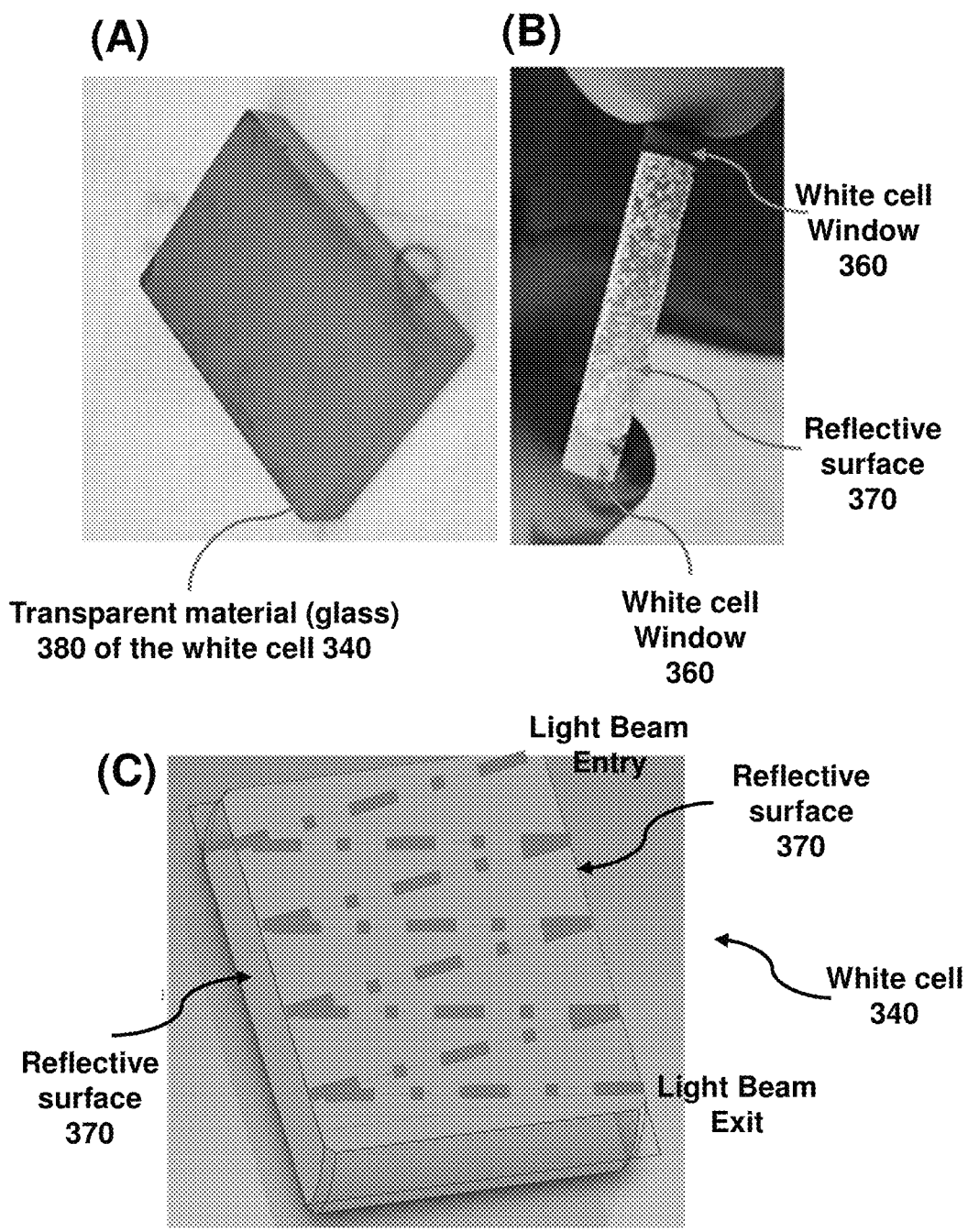
FIG. 8. illustrates (A) an exemplary a glass block 380 used to manufacture a multi-pass dispersion compensation cell of this disclosure, (B) two multi-pass dispersion compensation cell windows and a reflective surface formed on one of the surfaces of this glass block, and (C) a light beam path formed (shown with bracketed red lines) within the multi-pass dispersion compensation cell.

Two exemplary HHOCT units 500 comprising sample optical probes 400 are shown in FIGS. 6-7. These optical probes may have varying lengths suitable for different applications, for example, ears with varying ear canal lengths.

In FIG. 6, the optical probe 400 comprises a GRIN lens. Single wavelength graded-index (GRIN) lens may be used to collimate the output from an optical fiber by varying the index of refraction in radial direction within the lens itself. The GRIN lens may particularly be useful in configurations where device miniaturization is desired and space constraints are at a premium.

Such GRIN lenses are commercially available, for example, from GoFoton Inc. (https://www.gofoton.com/product/selfoc-rod-lens/). We can use SRL-130-050 (1.3 mm diameter and 33.5 mm in length with a ½ pitch) and SRL-270-100 (2.7 mm diameter and 79.35 mm in length with a ½ pitch) to cover the desired length range of the optical probes. The proximal end of the optical probe is connected via a standard SMA fiber connector so that it is easily replaceable/switchable with other sizes. The SMA fiber connectors are commercially available, for example from Thorlabs, (https://www.thorlabs.com/thorproduct.cfm?partnumber=11580).

To manufacture the HHOCT unit 500, which is compatible with otoscopic applications, an about −80 mm focal length concave lens is placed in front of the about 30 mm focal length convex lens, as shown in FIG. 7. The resulting focal length from the second lens should then be about 48 mm. When using a speculum, the working distance (WD) from the distal end of the optical probe 400 to the sample's image plane may be about 16.65 mm. The focused beam spot size is about 50 micrometers FWHM at the focal plane, which may be sufficient to resolve the middle ear structures.

Example 3. An Exemplary Multi-Pass Dispersion Compensation Cell

The sinusoidal interference signal, the main signal of optical coherence tomography, can only be generated when the beam path length between the sample arm and reference arm is matched. If there is a difference of beam path length of each of these two arms, beyond a detectable range related with frequency resolution of the detector, an OCT image may not be obtained.

With the incorporation of the multi-pass dispersion compensation cell 340 of this disclosure, the optical beam path length of the reference arm may be matched to the varying optical beam path length of the sample arm depending on different types of optical probe 400 length. Mainly, the multi-pass dispersion compensation cell may really be a useful component in obtaining OCT systems with compact dimensions as shown by the exemplary hand-held OCT (HHOCT) units shown in FIGS. 5-7. By changing the light beam's angle of incidence on the incident surface (e.g., multi-pass dispersion compensation cell window) of the multi-pass dispersion compensation cell, the optical path length between the reference arm and the sample arm may be matched without varying the size of the hand-held OCT (HHOCT) unit 500.

In addition, the refractive index of the multi-pass dispersion compensation cell block 380 may be similar with the refractive index of the optical probe 400 that aids in reducing the dispersion mismatch between the reference arm and the sample arm.

The OCT system of this disclosure, which includes an HHOCT unit with the multi-pass dispersion compensation cell, the dispersion mismatch may be numerically compensated to achieve the similar full width at half maximum (FWHM) of axial point spread function (PSF) with the desired high resolution since the optical properties of the reference arm may not substantially match with the optical properties of the sample arm. This is because the optical components in manufacturing of the HHOCT unit and the (biological) sample interrogated with such unit may have varying and/or different optical properties.

The numerical dispersion compensation method may be used to correct the PSF along the imaging depth after having the OCT signal. Because of nonlinearity caused by the biological sample's optical properties, the spacing of period in the interference signal may not be constant. Thus, FWHM of PSF after signal processing, the inverse Fourier transform, may not have the same value along the depth. The FWHM of PSF could initially be broader than or get broader along the depth than the calculated FWHM of PSF based on the light source bandwidth called the coherence length. After correcting the non-equal spacing of sinusoidal interferogram signal by applying numerical dispersion compensation, the FWHM of PSF may match with the desired value that provides more depth-resolved image.

The photographs of an exemplary multi-pass dispersion compensation cell 340 manufactured as a component of the hand-held unit of the OCT system ("HHOCT unit") are shown in FIG. 6. The construction of this multi-pass dispersion compensation cell 340 is illustrated in FIG. 3. The multi-pass dispersion compensation cell 340 comprises an optically transparent glass rectangular prism 380, as shown in FIG. 6(A). One surface of this glass prism 380 was partially coated in the middle of this surface with a reflective coating (a gold-colored coating) 370, as shown in FIG. 6(B). The same surface has two transparent surfaces, (e.g., multi-pass dispersion compensation cell windows 360), at both ends of the reflective coating 370, which allow the entry of the light beam to the multi-pass dispersion compensation cell and exit of the light beam from the multi-pass dispersion compensation cell. The surface of the multi-pass dispersion compensation cell opposite to the surface shown in FIG. 6(B) was also coated with a reflective surface that allows the light beam (illustrated as red bracketed lines), which entered the multi-pass dispersion compensation cell, bounce back and forth between two reflective surfaces at least twice, before the light beams leave the multi-pass dispersion compensation cell, as shown in FIG. 6(C).

The transparent surfaces, (e.g., multi-pass dispersion compensation cell windows 360) where the light enters or exits the multi-pass dispersion compensation cell 340 may be coated with any appropriate anti-reflective coating depending on the wavelength of the light beam formed by the light source. In order to make multi-beam paths within a multi-pass dispersion compensation cell the surfaces are coated with a coating comprising metal such as a gold, silver, aluminum, or a combinations thereof to a mirror quality to achieve a high reflectivity. The reflective coatings shown in FIG. 6 were manufactured by depositing a gold coating on the glass rectangular prism.

Figure 9:
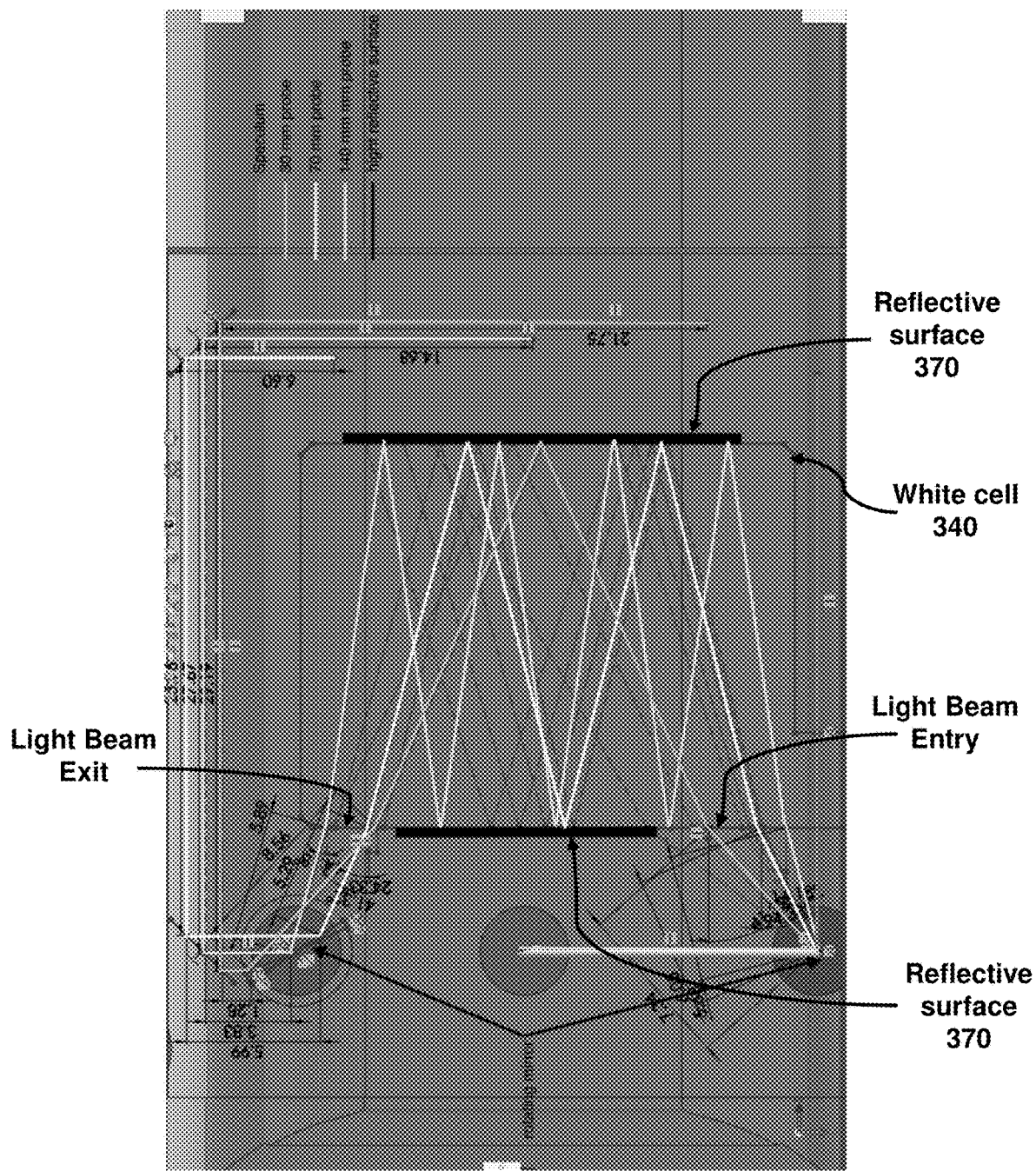
FIG. 9. illustrates light beams and their varying path lengths formed by varying the angle of incidence of the light beam entering the multi-pass dispersion compensation cell.
Figure 10:
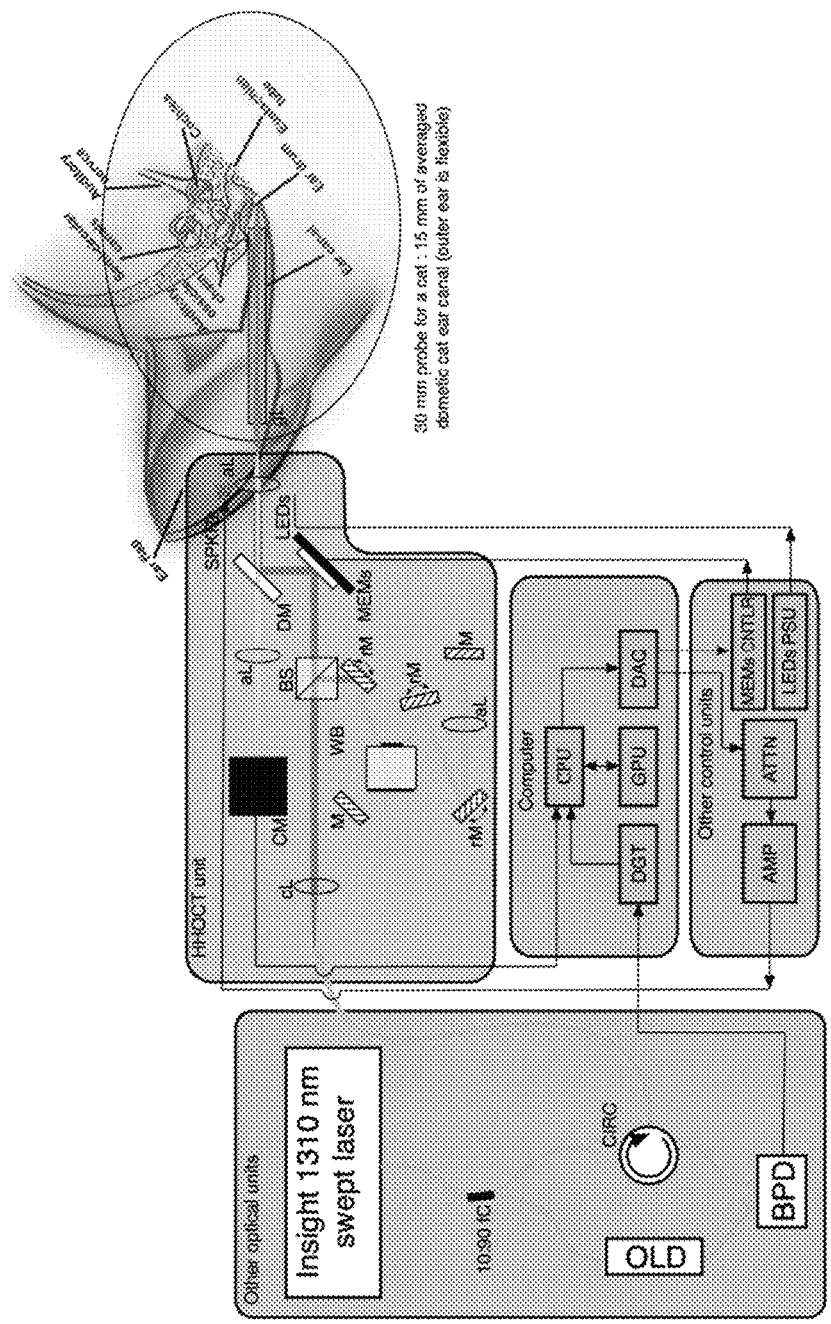
FIG. 10. illustrates how an exemplary OCT system of this invention may be applied to a cat ear by using an HHOCT unit with an optical probe deployed into the ear canal of the cat ear.
Figure 11:
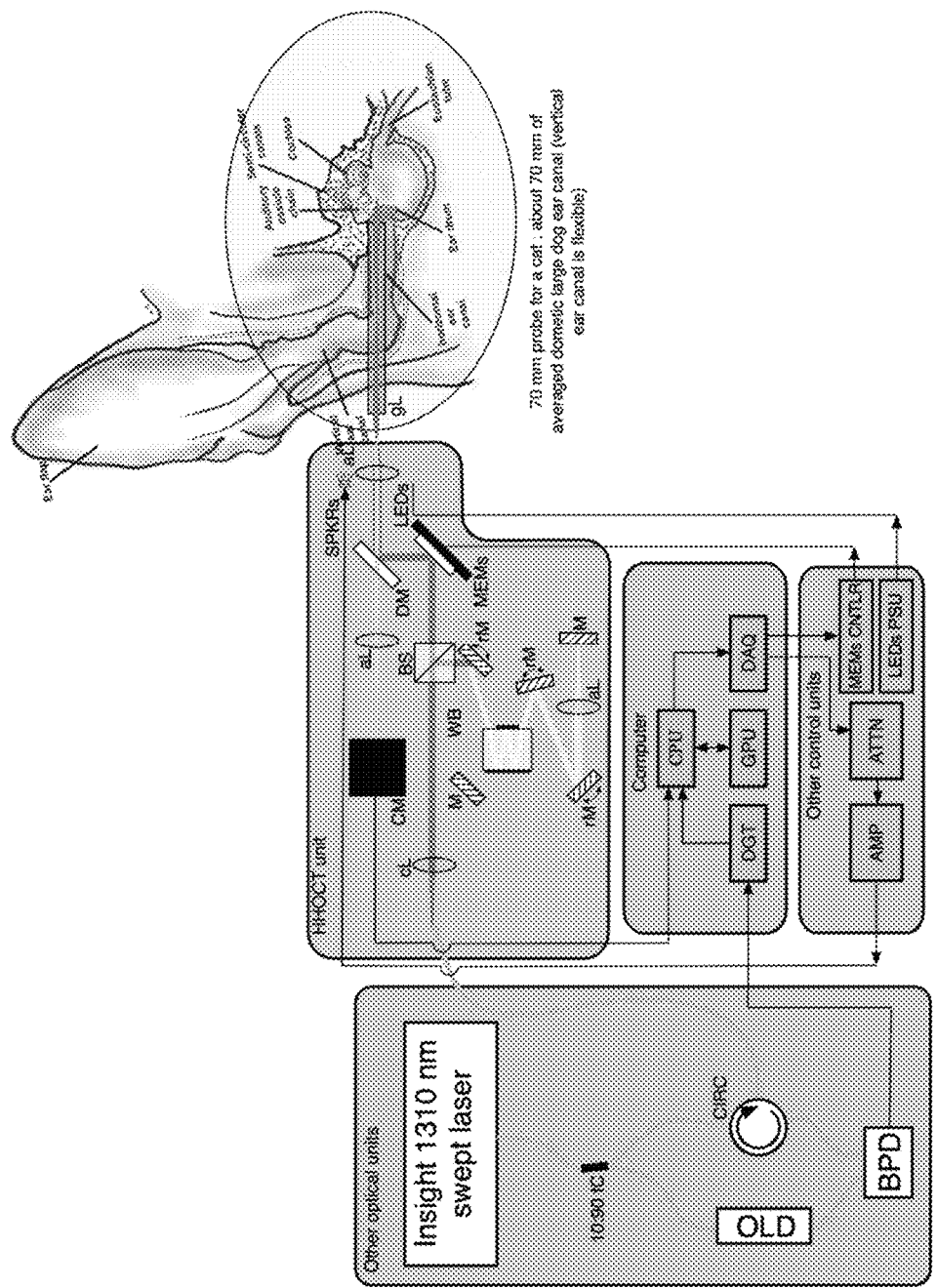
FIG. 11. illustrates how an exemplary OCT system of this invention may be applied to a large dog ear by using an HHOCT unit with an optical probe deployed into the ear canal of the dog ear.
Figure 12:
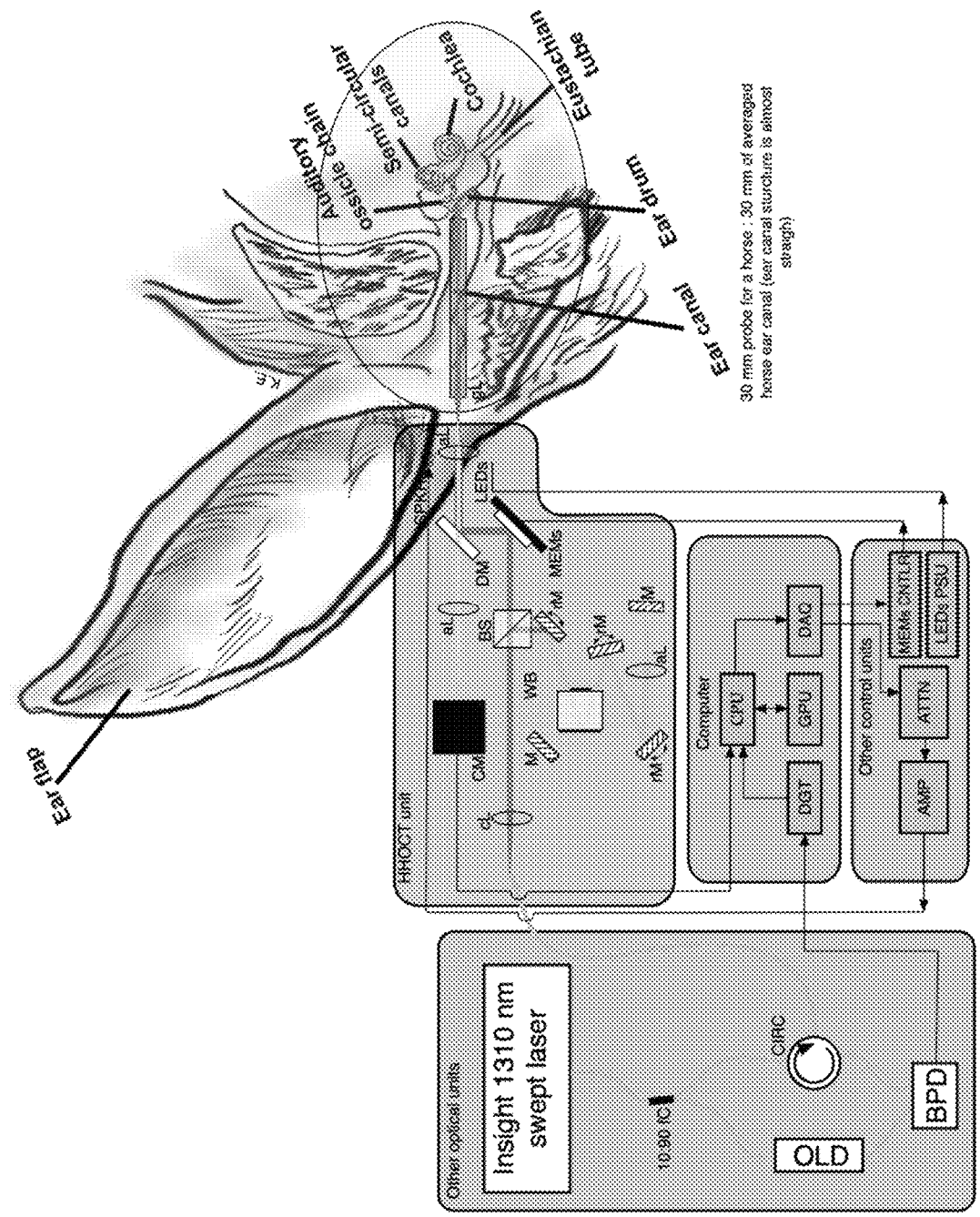
FIG. 12. illustrates how an exemplary OCT system of this invention may be applied to a horse ear by using an HHOCT unit with an optical probe deployed into the ear canal of the horse ear FIG. 13. illustrates how an exemplary OCT system of this invention may be applied to a human ear by using an HHOCT unit with an optical probe deployed into the ear canal of the human ear.
Figure 13:
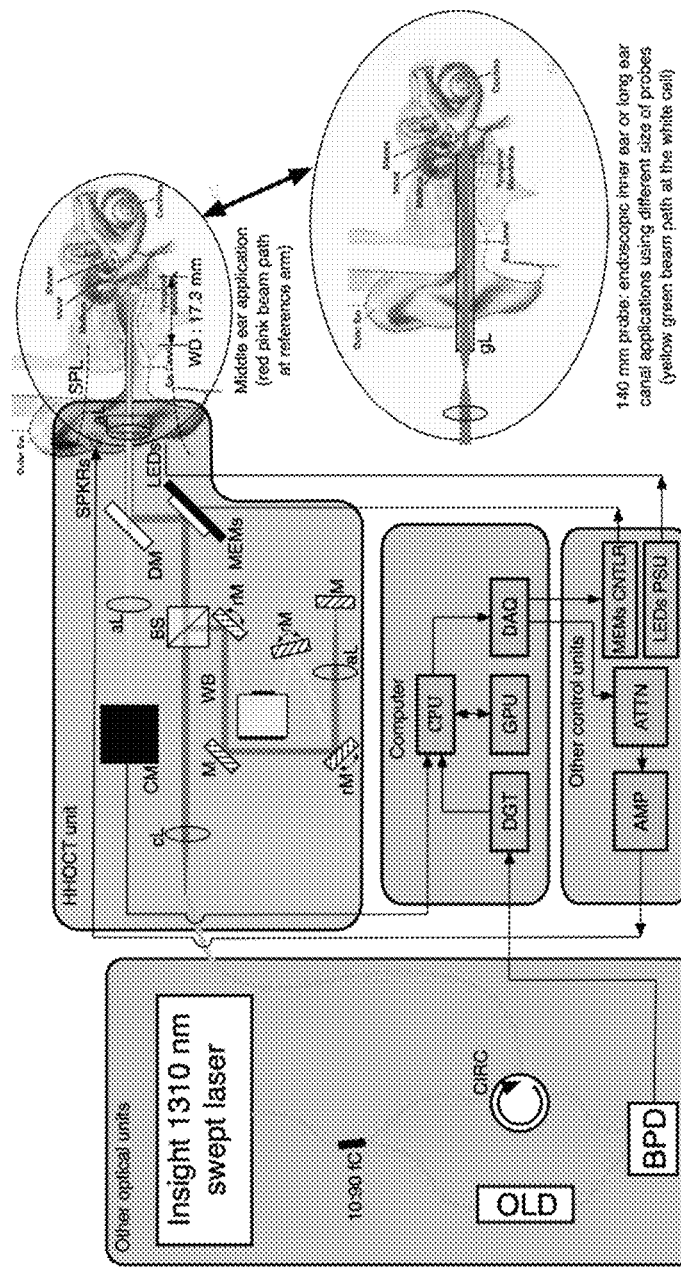

By varying the incident angle of the input beam, the optical path length within the glass block can be changed depending on changing number of multiply reflected beam, as shown in FIG. 9. By using this multi-beam path multi-pass dispersion compensation cell at the reference arm of the OCT device 300 of this disclosure, not only can the optical beam path-length be varied, but also dispersion may be physically matched to that of the sample arm's optical path-length.

Such multi-pass dispersion compensation cells of this disclosure are particularly useful for an OCT system that requires different types of scanning probes. For an imaging application targeting the ear, one of the challenges is to design a proper scanning probe with respect to anatomical differences between patients or animals, and differences between middle and inner ear anatomy. And the multi-pass dispersion compensation cells of this disclosure fulfill this requirement.

The beam splitter, 120 splits the light beam into two light beams, one guided for the sample arm and the other guided for the reference arm of the OCT system. Along the reference arm's optical path, the light beam is reflected and tilted by the rotating mirror. The incident angle can be changed and is set with respect to different probe or speculum lengths. The multi-pass dispersion compensation cell is a glass block that is made from dispersion matching glass (LSMO5DC, refractive index: about 1.67) from Thorlabs, Inc. In order to correctly fit the multi-pass dispersion compensation cell 340 inside the HHOCT unit 500, the original cylindrical rod shape of the glass may need to be cut into a rectangular prism.

FIG. 9 traces all possible reference arm beam paths varying with the change of the incidence angle. Depending on the optical probe type, length and the incidence angle, the light beam's path length can be varied. For the speculum application, the red line indicates the beam path.

The angle of incidence of the light beam is related to the angle of refraction are related through Snell's law (Eq. 1).

$$n_1 \sin \theta_1 = n_2 \sin \theta_2 \qquad \text{Equation (1)}$$

Where $n_1$ is incident index, $n_2$ is refracted index, $\theta_1$ is angle of incidence and $\theta_2$ is the angle of refraction. The angle of refraction then can be expressed as:

$$\theta_2 = \sin^{-1}\left(\frac{n_1}{n_2}\sin \theta_1\right) \qquad \text{Equation (2)}$$

The refracted index ($n_2$) can be found from the list of refractive indices or provided from the material specification. Based on the dispersion glass material (LSMO5DC, Thorlabs) used in this example, $n_2$ is about 1.67. The incident index, $n_1$ is about 1 since the incident light beam comes from air. However, the incident index may vary with the variation of the refractive index of the medium in which the light beam travels before it enters the multi-pass dispersion compensation cell.

FIG. 9 shows the multiple beam path lengths inside the multi-pass dispersion compensation cell's glass block, which is highlighted with a blue solid line. Depending on $\theta_1$ and the calculated $\theta_2$, the beam path was drawn by Solidworks, a CAD program. The measured beam path length in Solidworks was optimized to match the probe length by changing the incident angle, $\theta_1$.

For some applications, the angle of incidence of the light beam entering the multi-pass dispersion compensation cell may be about 0 degrees. At this incidence angle, the beam passes through the multi-pass dispersion compensation cell block that has a total thickness of glass which may match the path length (including reflections within the multi-pass dispersion compensation cell block) of the transmitting optics in the sample arm.

For an optical probe suitable for an ear canal with about 30 mm length, the angle of incidence of the light beam entering the multi-pass dispersion compensation cell may be about 41.32 degrees, which may result in about 37.74 mm beam path length within the multi-pass dispersion compensation cell. The length of the appropriate GRIN lens for this ear canal application may be about 33.5 mm.

For an optical probe suitable for an ear canal with about 70 mm length, the angle of incidence of the light beam entering the multi-pass dispersion compensation cell may be about 24.33 degrees, which may result in about 71.52 mm beam path length within the multi-pass dispersion compensation cell. The length of the appropriate GRIN lens for this ear canal application may be about 79.35 mm.

The differences between the probe and multi-pass dispersion compensation cell path length may be compensated by adding more physical space (e.g. air) along the beam path length.

Based on these two ear canal applications (30 mm and 70 mm lengths), the minimum incidence angle may be about 14.18 degrees and may require the longest beam path length inside of the multi-pass dispersion compensation cell, about 140.16 mm. This beam path length within the multi-pass dispersion compensation cell may be matched with the 140.7 mm GRIN lens (SRL-270-100, 2.7 mm diameter). In contrast, the maximum incidence angle may be about 41.32 degrees for the about 30 mm ear canal length application and may follow a shorter beam path within the multi-pass dispersion compensation cell.

The exiting light beams from the multi-pass dispersion compensation cell may be tilted by the rotating mirror to make them parallel. The rotating mirror may be set at a specific angle for each probe. Finally, the beam may correctly be reflected from the 45-degree angled mirror, and then focused on the final reflector that is located in different positions related to the different path lengths between the probe lengths and beam path length inside the multi-pass dispersion compensation cell.

FIGS. 10-13 shows, by way of example, how the OCT system of this disclosure may be used with different ear shapes and ear canal lengths.

Example 4. Fabrication of Multi-Pass Dispersion Compensation Cell

The multi-pass dispersion compensation cell may need to be manufactured by using an optically transparent material. An optical glass may be used as the transparent material. Other examples of the multi-pass dispersion compensation cell material of construction may be polydimethylsiloxane (PDMS) or a UV curable optical epoxy. The PDMS has above 90% optical transmission in a wavelength in the range of about 350 nm to about 800 nm. The UV curable optical epoxy may have above 90% transmission in a wavelength in the range of about 400 nm to 2,000 nm. By using a custom cuboid mold for casting a multi-pass dispersion compensation cells from polymers, physical dimensions of the multi-pass dispersion compensation cell can be varied.

The multi-pass dispersion compensation cell may need at least one surface that has a surface finish with optically sufficient flatness. The mold can be designed by Solidworks. Microscope cover glasses may be used in constructing such molds to have desired surface finish for the multi-pass dispersion compensation cell. The microscope cover glass may need to have high degree of flatness to prevent the spherical aberration. The cover glass can be placed at the sides of the cuboid mold where the beam passes through. After curing the polymer in the mold, the mold may be disassembled to remove the multi-pass dispersion compensation cell block.

To manufacture reflective coatings on the surfaces of the multi-pass dispersion compensation cell block, and obtain the desired mirror effect, a commercial mirror spray paint (267727 specialty mirror spray, Rust-Oleum) may be used. About 40% reflectivity may easily be obtained by using this paint. Typically, the direct output power from a laser light source is powerful to cause the detector to saturate. Thus 40% reflectivity may be sufficient to have good SNR that is relevant to the dynamic range of a detector. Additionally, the reflectivity may be improved by controlling the painting quality. For the multi-pass dispersion compensation cell windows where the light beam enters or exits, the masking tape or any regular tape may be used to cover the area for the multi-pass dispersion compensation cell windows to prevent them from getting painted during the manufacturing of the multi-pass dispersion compensation cell with reflective coatings.

All articles, patents, patent applications, and other publications that have been cited in this disclosure are incorporated herein by reference.

In this disclosure, the indefinite article "a" and phrases "one or more" and "at least one" are synonymous and mean "at least one".

Relational terms such as "first" and "second" and the like may be used solely to distinguish one entity or action from another, without necessarily requiring or implying any actual relationship or order between them. The terms "comprises," "comprising," and any other variation thereof when used in connection with a list of elements in the specification or claims are intended to indicate that the list is not exclusive and that other elements may be included. Similarly, an element preceded by an "a" or an "an" does not, without further constraints, preclude the existence of additional elements of the identical type.

The abstract is provided to help the reader quickly ascertain the nature of the technical disclosure. It is submitted with the understanding that it will not be used to interpret or limit the scope or meaning of the claims. In addition, various features in the foregoing detailed description are grouped together in various examples to streamline the disclosure. This method of disclosure should not be interpreted as requiring claimed examples to require more features than are expressly recited in each claim. Rather, as the following claims reflect, inventive subject matter lies in less than all features of a single disclosed example. Thus, the following claims are hereby incorporated into the detailed description, with each claim standing on its own as separately claimed subject matter.

Additional Embodiments

As used herein, "system," "instrument," "apparatus," and "device" generally encompass both the hardware (for example, mechanical and electronic) and, in some implementations, associated software (for example, specialized computer programs for graphics control) components.

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

Each of the processes, methods, and algorithms described in the preceding sections may be embodied in, and fully or partially automated by, code modules executed by one or more computer systems or computer processors including computer hardware. The code modules may be stored on any type of non-transitory computer-readable medium or computer storage device, such as hard drives, solid state memory, optical disc, and/or the like. The systems and modules may also be transmitted as generated data signals (for example, as part of a carrier wave or other analog or digital propagated signal) on a variety of computer-readable transmission mediums, including wireless-based and wired/cable-based mediums, and may take a variety of forms (for example, as part of a single or multiplexed analog signal, or as multiple discrete digital packets or frames). The processes and algorithms may be implemented partially or wholly in application-specific circuitry. The results of the disclosed processes and process steps may be stored, persistently or otherwise, in any type of non-transitory computer storage such as, for example, volatile or non-volatile storage.

Many other variations than those described herein will be apparent from this disclosure. For example, depending on the embodiment, certain acts, events, or functions of any of the algorithms described herein can be performed in a different sequence, can be added, merged, or left out altogether (for example, not all described acts or events are necessary for the practice of the algorithms). Moreover, in certain embodiments, acts or events can be performed concurrently, for example, through multi-threaded processing, interrupt processing, or multiple processors or processor cores or on other parallel architectures, rather than sequentially. In addition, different tasks or processes can be performed by different machines and/or computing systems that can function together.

The various illustrative logical blocks, modules, and algorithm elements described in connection with the embodiments disclosed herein can be implemented as electronic hardware, computer software, or combinations of both. To clearly illustrate this interchangeability of hardware and software, various illustrative components, blocks, modules, and elements have been described herein generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The various features and processes described herein may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

The various illustrative logical blocks and modules described in connection with the embodiments disclosed herein can be implemented or performed by a machine, such as a general purpose processor, a digital signal processor ("DSP"), an application specific integrated circuit ("ASIC"), a field programmable gate array ("FPGA") or other programmable logic device, discrete gate or transistor logic, discrete hardware components, or any combination thereof designed to perform the functions described herein. A general purpose processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable devices that performs logic operations without processing computer-executable instructions. A processor can also be implemented as a combination of computing devices, for example, a combination of a DSP and a microprocessor, a plurality of microprocessors, one or more microprocessors in conjunction with a DSP core, or any other such configuration. Although described herein primarily with respect to digital technology, a processor may also include primarily analog components. For example, some, or all, of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, or algorithm described in connection with the embodiments disclosed herein can be embodied directly in hardware, in a software module stored in one or more memory devices and executed by one or more processors, or in a combination of the two. A software module can reside in RAM memory, flash memory, ROM memory, EPROM memory, EEPROM memory, registers, hard disk, a removable disk, a CD-ROM, or any other form of non-transitory computer-readable storage medium, media, or physical computer storage known in the art. An example storage medium can be coupled to the processor such that the processor can read information from, and write information to, the storage medium. In the alternative, the storage medium can be integral to the processor. The storage medium can be volatile or nonvolatile. The processor and the storage medium can reside in an ASIC. The ASIC can reside in a user terminal. In the alternative, the processor and the storage medium can reside as discrete components in a user terminal.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is otherwise understood with the context as used in general to present that an item, term, and so forth, may be either X, Y, or Z, or any combination thereof (for example, X, Y, and/or Z). Thus, such disjunctive language is not generally intended to, and should not, imply that certain embodiments require at least one of X, at least one of Y, or at least one of Z to each be present.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

All of the methods and processes described herein may be embodied in, and partially or fully automated via, software code modules executed by one or more general purpose computers. For example, the methods described herein may be performed by the computing system and/or any other suitable computing device. The methods may be executed on the computing devices in response to execution of software instructions or other executable code read from a tangible computer readable medium. A tangible computer readable medium is a data storage device that can store data that is readable by a computer system. Examples of computer readable mediums include read-only memory, random-access memory, other volatile or non-volatile memory devices, CD-ROMs, magnetic tape, flash drives, and optical data storage devices.

It should be emphasized that many variations and modifications may be made to the herein-described embodiments, the elements of which are to be understood as being among other acceptable examples. All such modifications and variations are intended to be included herein within the scope of this disclosure. The section headings used herein are merely provided to enhance readability and are not intended to limit the scope of the embodiments disclosed in a particular section to the features or elements disclosed in that section. The foregoing description details certain embodiments. It will be appreciated, however, that no matter how detailed the foregoing appears in text, the systems and methods can be practiced in many ways. As is also stated herein, it should be noted that the use of particular terminology when describing certain features or aspects of the systems and methods should not be taken to imply that the terminology is being re-defined herein to be restricted to including any specific characteristics of the features or aspects of the systems and methods with which that terminology is associated.

Those of skill in the art would understand that information, messages, and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The invention claimed is:

1. An optical coherence tomography (OCT) system configured to interrogate a sample, the OCT system comprising: at least one light source, and a reference arm light guiding system; wherein:
   the light source is configured to form a light beam;
   the reference arm comprises a multi-pass dispersion compensation cell and a mirror;
   the multi-pass dispersion compensation cell comprises a transparent prism, wherein two highly reflective surfaces of the prism are highly reflective to the light beam, wherein the transparent prism is configured so that the light beam enters the multi-pass dispersion compensation cell through a first transparent surface and the light beam exits from a second transparent surface; and
   the multi-pass dispersion compensation cell is configured to extend a path length of the light beam that enters the multi-pass dispersion compensation cell based on reflecting the light beam back and forth on the two highly reflective surfaces of the prism before the light beam exits the multi-pass dispersion compensation cell.

2. The OCT system of claim 1, further comprising a detector configured generate an OCT signal in response to detecting the light beam after the light beam exits the multi-pass dispersion compensation cell.

3. The OCT system of claim 1, wherein the two highly reflective surfaces are positioned parallel to each other.

4. The OCT system of claim 1, wherein the two highly reflective surfaces is are substantially flat.

5. The OCT system of claim 1, wherein the multi-pass dispersion compensation cell comprises at least two reflective surfaces oriented with respect to each other such that the light beam entering into the multi-pass dispersion compensation cell reflects off the at least two reflective surfaces at least once, thereby delaying the light beam before it exits the multi-pass dispersion compensation cell.

6. The OCT system of claim 1, wherein the reference arm further comprises a light guiding system configured to control an angle of incidence of the light beam formed by the light source entering and/or exiting the multi-pass dispersion compensation cell, thereby increasing a path length of the light beam.

7. The OCT system of claim 6, wherein the reference arm light guiding system comprises a mirror, wherein the mirror is configured to rotate.

8. The OCT system of claim 1, wherein the OCT system comprises a hand-held OCT unit ("HHOCT unit"); wherein the HHOCT unit comprises the reference arm, a sample arm, and a detector.

9. The OCT system of claim 1, further comprising a sample arm, wherein the sample arm comprises at least one scanning optic, and an optical probe; wherein the optical probe is configured to guide the light beam to a surface of the sample arm.

10. The OCT system of claim 9, wherein the optical probe comprises a gradient index (GRIN) lens.

11. The OCT system of claim 9, wherein the scanning optic comprises a scanning mirror.

* * * * *